(12) United States Patent
Sekiguchi et al.

(10) Patent No.: US 8,645,953 B2
(45) Date of Patent: *Feb. 4, 2014

(54) METHOD OF CHECKING A POSSIBILITY OF EXECUTING A VIRTUAL MACHINE

(75) Inventors: Tomoki Sekiguchi, Sagamihara (JP); Hidetoshi Sato, Ebina (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,432

(22) Filed: Sep. 11, 2012

(65) Prior Publication Data

US 2013/0007743 A1 Jan. 3, 2013

Related U.S. Application Data

(63) Continuation of application No. 12/136,327, filed on Jun. 10, 2008, now Pat. No. 8,291,412.

(30) Foreign Application Priority Data

Sep. 13, 2007 (JP) .................................. 2007-237936

(51) Int. Cl.
*G06F 9/455* (2006.01)

(52) U.S. Cl.
USPC .............................................................. 718/1

(58) Field of Classification Search
None
See application file for complete search history.

(56) References Cited

U.S. PATENT DOCUMENTS

| | | | |
|---|---|---|---|
| 6,802,062 | B1 | 10/2004 | Oyamada et al. |
| 7,577,722 | B1 | 8/2009 | Khandekar et al. |
| 2003/0200247 | A1 | 10/2003 | Banzhaf et al. |
| 2006/0000697 | A1 | 1/2006 | Houck et al. |
| 2006/0174087 | A1 | 8/2006 | Hashimoto et al. |
| 2007/0174658 | A1 | 7/2007 | Takamoto et al. |

FOREIGN PATENT DOCUMENTS

| | | |
|---|---|---|
| JP | 10-283210 A | 10/1998 |
| JP | 2006-209487 A | 8/2006 |

OTHER PUBLICATIONS

"AMD I/O Virtualization Technology (IOMMU) Specification," 79 pages, http://www.amd.com/us-en/assets/content_type/white_papers_and_tech_docs/34434.pdf, retrieved on Jul. 24, 2006, Advanced Micro Devices, Inc.
Entire Prosecution History of U.S. Appl. No. 12/136,327, filed Jun. 10, 2008 entitled Method of Checking a Possibility of Executing a Virtual Machine.
Japanese Office Action issued in Japanese Patent Application No. 2007-237936, mailed Jan. 25, 2011.
Japanese Office Action issued in Japanese Patent Application No. 2007-237936, dated Dec. 6, 2011.

*Primary Examiner* — Meng An
*Assistant Examiner* — Blake Kumabe
(74) *Attorney, Agent, or Firm* — McDermott Will & Emery LLP (57) ABSTRACT

To determine, when a virtual machine is executed by an arbitrary machine, whether the virtual machine can access computer resources required for the virtual machine, provided is a method of checking a possibility of executing a virtual machine including a first physical computer for executing a first virtual machine and a second physical computer capable of executing a virtual machine. The method includes the steps of: acquiring information on first logical resources; acquiring setting information set to a adaptor of the first physical computer so that the first virtual machine accesses the first logical resources; listing second logical resources accessible when the first virtual machine is executed by the second physical computer by setting the setting information to a adaptor of the second physical computer; and determining whether the first virtual machine can be executed by the second physical computer by comparing the first and second logical resources.

10 Claims, 8 Drawing Sheets

VM CONFIGURATION DEFINITION TABLE 410

| VM NAME | NUMBER OF CPU'S | MEMORY SIZE | NETWORK ADAPTOR | DISK ADAPTOR |
|---|---|---|---|---|
| VM 1 | 4 | 4GB | eth0 – NET1 | scsi0 – PORT0 |
| VM 2 | 2 | 2GB | eth0 – NET2<br>eth1 – NET3 (D) | scsi0 – PORT1<br>scsi1 – PORT2 (D) |
| ......... | ... | ... | ......... | ......... |

*FIG. 5*

SERVER RESOURCE TABLE 420

| SERVER NAME | NUMBER OF CPU'S | MEMORY SIZE | NETWORK ADAPTOR | DISK ADAPTOR |
|---|---|---|---|---|
| SERVER 1 | 4 | 8GB | eth0 | scsi0 |
| SERVER 2 | 2 | 16GB | eth0, eth1 | scsi0, scsi1 |
| SERVER 3 | 8 | 8GB | eth0, eth1 | scsi0, scsi1 |

*FIG. 6*

VM RESOURCE TABLE 430

| VM NAME | LOGICAL VOLUME IDENTIFIER | DISK ADAPTOR | CONNECTION DESTINATION HOST NAME | NETWORK ADAPTOR |
|---|---|---|---|---|
| VM 1 | STR1-VOL1 | scsi0 | SERVER a | eth0 |
| VM 2 | STR1-VOL2<br>STR2-VOL1 | scsi0<br>scsi1 | SERVER a | eth0 |
|  |  |  |  |  |

METHOD OF CHECKING A POSSIBILITY OF EXECUTING A VIRTUAL MACHINE

RELATED APPLICATIONS

The present application is a Continuation of U.S. patent application Ser. No. 12/136,327, filed on Jun. 10, 2008, now U.S. Pat. No. 8,291,412, which claims priority from Japanese application P2007-237936 filed on Sep. 13, 2007, the contents of which are hereby incorporated by reference into this application.

BACKGROUND OF THE INVENTION

This invention relates to management of a computer system for executing a plurality of guest OS'es by means of a virtual machine mechanism or a logical partitioning mechanism. This invention more particularly relates to a method and a system for determining whether, when a virtual machine is executed on a certain host machine, the virtual machine can access storage volumes and networks to be used by the virtual machine before the virtual machine is actually executed on the host machine.

A technology of building virtual machines on a single physical machine, and causing the virtual machines to execute a plurality of operating systems (OS'es) in parallel has become widespread. Technologies of realizing such a technology include the virtual machine system and the logical partitioning system (LPAR). The OS'es executed according to those technologies are referred to as guest OS'es.

According to the virtual machine system, a control software program referred to as a virtual machine monitor (VMM) generates a plurality of virtual machines (VM's) by virtualizing a special register (control register) for controlling operations of hardware and a processor of a physical machine. The guest OS is executed on the VM generated by the VMM. Specifically, the VMM traps and emulates privileged instructions of a CPU such as I/O instructions and operations on the control register executed by the guest OS, thereby producing a virtual machine environment. In the virtual machine system, a plurality of guest OS'es can share a single physical I/O device. This is realized by a process (emulation) in which the VMM traps access to a virtual I/O device apparent to the guest OS, and converts this access to access to the actual physical I/O device. As a result, there is provided a flexible virtual machine environment less dependent on physical I/O devices mounted on a physical machine.

In the I/O control of the virtual machine system, the I/O operation by the guest OS is emulated by the VMM, resulting in an overhead. Moreover, the VMM for the VM's emulates an I/O operation of other guest OS'es executed in parallel, and thus, the overhead also depends on the processes of those other guest OS'es, and there is posed a problem in that performance prediction is difficult.

On the other hand, according to the logical partitioning system, a control software program referred to as a hypervisor produces a plurality of VM's by logically partitioning resources of a physical machine. The hypervisor logically partitions the physical machine by manipulating tables and registers referred to by a processor and other hardware components. A guest OS is executed in a partition (logical partition) logically partitioned by the hypervisor. Instructions executed by the guest OS are not emulated, but are directly executed by the processor. As a result, the guest OS is hardly affected by other OS'es executed on the same physical machine, resulting in a high-performance and highly-reliable virtual machine environment. On the other hand, the logical partitioning system produces a plurality of VM's by partitioning hardware resources, and thus, an I/O device cannot be shared by a plurality of guest OS'es. In the logical partitioning system, when the I/O device is shared by the plurality of guest OS'es, adaptation to the I/O device is required.

As described above, VM's executing guest OS'es are generated by emulating privileged instructions in the virtual machine system, or by partitioning a physical machine by the hypervisor in the logical partitioning system.

Those technologies have been conventionally realized mainly on computers in the mainframe class. This is because realization of those technologies provided with a high performance requires special hardware such as a processor prepared for a VM, and a mechanism carrying out the emulation process of the VMM as hardware. As a result of an increase in performance of processors and integration of a virtualization mechanism in recent years, a sufficient performance is provided even when those processes are executed on a processor, and thus, the virtual machine system and the logical partitioning system have become widespread in general computers in addition to the computers in the mainframe class.

The virtual machine system has a characteristic that a VM defined on a certain machine can be executed on another machine operated by a VMM. It is also possible to move (migrate) an operating VM to another machine without stopping the operating VM. If a VMM on a machine of the migration destination can be configured to emulate I/O devices required by the VM to migrate as set on originally defined I/O devices, the VM can be executed on the machine of the migration destination exactly as before the migration.

Those technologies can integrate systems running on a plurality of physical machines to a single physical machine, can balance loads by means of migration of guest OS'es according to loads imposed on machines, and can increase the availability of a computer system by means of migration of guest OS'es in a case of a machine failure. As an example of relocation of a VM to another machine in a system, US Patent Application Publication No. 2006/00697 discloses a method of relocating a VM according to an operating state of a machine.

Moreover, on a VM, hardware mechanisms enabling a guest OS to directly operate I/O devices are provided. One of those mechanisms is an I/O address conversion mechanism. Generally, when an OS instructs an I/O device to transfer data by means of the DMA, the OS specifies a physical address of a destination of the data transfer for the I/O device. If an OS is executed on a VM, a physical address specified by the guest OS is a physical address virtualized by a VMM, and is not an actual physical address. On the other hand, a physical address space apparent to the I/O device is an actual physical address space. The I/O address conversion mechanism converts a transfer destination address for the DMA transfer from the I/O device according to the guest OS using the I/O device, thereby causing data to be transferred to a physical memory area assigned to the guest OS. When the VMM sets the I/O address conversion mechanism according to a configuration of the guest OS and a state of a memory assignment, even if the guest OS does not know the actual physical memory address, the guest OS can issue an I/O instruction directly to the I/O device. The I/O address conversion mechanism is, for example, realized as described in "AMD I/O Virtualization Technology (IOMMU) Specification", p. 14, "2.2.5 Virtual Machine Guest Access to Devices", February 2006, Advance Micro Devices, Inc., which is available on the Internet at http://www.amd.com/us-en/assets/content_type/white_papers_and_tech_d ocs/34434.pdf (retrieved on Jul. 24, 2006).

As for storage systems and networks, a computer and a storage system, and a computer and a network are coupled via a switch, and it is possible to restrict logical volumes and network devices connectable from the computer using a function of an adaptor of the computer and a function of the switch. As examples of those functions, there are zoning of a fibre channel for the storage system, and the VLAN based on the Ethernet (registered trademark) for the network. Using those technologies, it is possible to logically partition connections to a storage system and a network, thereby increasing throughput and system security.

SUMMARY OF THE INVENTION

In a virtual machine system, freely selecting a host machine on which a VM is to be executed as in the case of the above-mentioned migration is advantageous in terms of an increase in availability of a guest OS.

On the other hand, in a virtual machine system, if a VM can be executed on another host machine but the VM cannot be coupled to logical resources required for the execution of the VM, such as volumes of a storage system or networks on the migration destination host machine, it is considered that the VM substantially cannot be executed on the host machine. An environment of a storage system or a network is generally constructed by using switches, and, depending on connection of the host machine to the switches and on setting of the switches, a VM may not be coupled to a volume or a network required for and referred to by the VM.

According to the above-mentioned conventional examples, in order to precisely know whether, on a host machine on which a VM is to be executed, computer resources for execution of the VM are accessible or not, it is necessary to actually execute the VM. If the determination whether the resources required for the VM are accessible or not can be made only after the execution of the VM, there is posed a problem in that a period of a discontinuation of a service provided by the VM including a period of resolving this problem thereafter becomes longer.

Moreover, in order to stabilize the performances of a guest OS and application programs executed on a VM, it is effective to exclusively assign an I/O device to the VM. It is thus necessary to provide a system which selectively exploits an increase in availability brought about by the flexibility in the relocation of a VM to a host machine, and an increase in performance brought about by the exclusive assignment of I/O devices.

In addition to such a system, for an operation of a computer system, there is a problem in that definitions of which host machine respective VM's are arranged on, and how I/O devices are assigned when a certain VM is to be executed on a certain host machine should be generated with the consideration of the above-mentioned perspective. Especially, when the number of host machines and VM's increase, if the definition is manually produced, a large amount of labor is necessary, and thus, automation of the generation of the definitions, or a system for supporting the generation of the definitions is necessary.

In view of the above, it is an object of this invention to quickly determine, when a virtual machine is executed on an arbitrary machine, whether the virtual machine can access computer resources required for the virtual machine.

According to this invention, there is provided a method of checking a possibility of executing a virtual machine including a first physical computer for executing a first virtual machine and a second physical computer capable of executing a virtual machine, for checking whether the first virtual machine can be executed by the second physical computer, the method including the steps of: acquiring information on first logical resources accessed by the first virtual machine; acquiring setting information set to a physical adaptor of the first physical computer so that the first virtual machine accesses the first logical resources; listing second logical resources accessible in a case where the first virtual machine is executed by the second physical computer by setting the setting information to a physical adaptor of the second physical computer; and determining whether the first virtual machine can be executed by the second physical computer by comparing the first logical resources and the second logical resources.

In more detail, the method includes: a VM management unit holding identifier information of logical volumes of a storage system accessed by the first virtual machine during execution, setting information set to a physical disk adaptor accessing the logical volumes, information on a network accessed by the first virtual machine during the execution, and setting information set to a physical network adaptor accessing the network; a logical volume listing unit for listing accessible logical volumes by setting the setting information set to the physical disk adaptor to a physical disk adaptor of the second physical machine; network connectivity checking means for determining a possibility of connection to machines accessed by the first virtual machine from the second physical machine by setting the setting information set to the physical network adaptor to a physical network adaptor of the second physical machine; and a VM management unit for executing the logical volume listing unit and the network connectivity checking unit of the second physical machine to execute the first virtual machine, and for determining a possibility of executing the first virtual machine specified based on a result of the execution on the second physical machine before the execution of the first virtual machine.

Thus, according to this invention, when a physical machine executing a virtual machine (first virtual machine) is changed, there can be determined a possibility of connection to logical volumes and networks required by the virtual machine in advance. As a result, it is possible to eliminate a possibility of an inadvertent executing the virtual machine on a host machine on which access to the volumes and the networks used by the virtual machine is not available. Then, it is possible to quickly determine accessibility to the computer resources required by the virtual machine.

DETAILED DESCRIPTION OF THE PREFERRED EMBODIMENTS

A description will now be given of embodiments of this invention with reference to drawings.

First Embodiment

A description will now be given of a first embodiment of this invention. The first embodiment provides, when a host machine executing a virtual machine (VM) is changed (virtual machine migrates to another host), a method of determining whether logical volumes used by the VM are accessed from the host machine of a migration destination.

Figure 1:
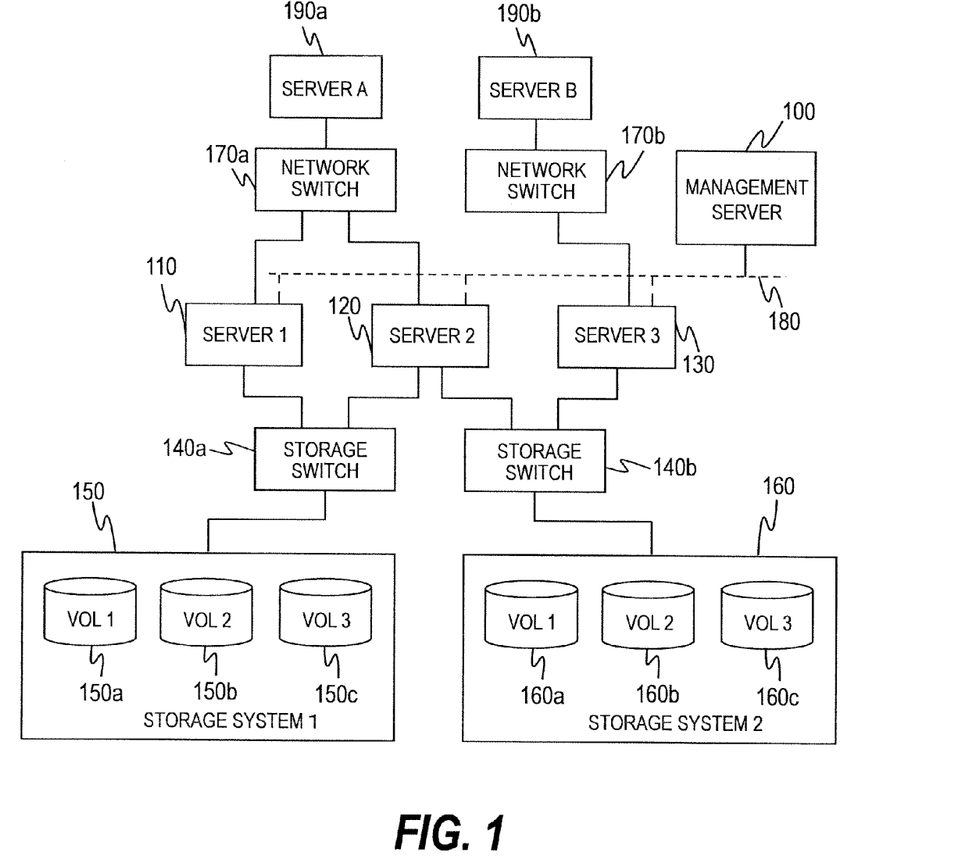
FIG. 1 is a block diagram showing an example of a system configuration according to a first embodiment of this invention.
Figure 2:
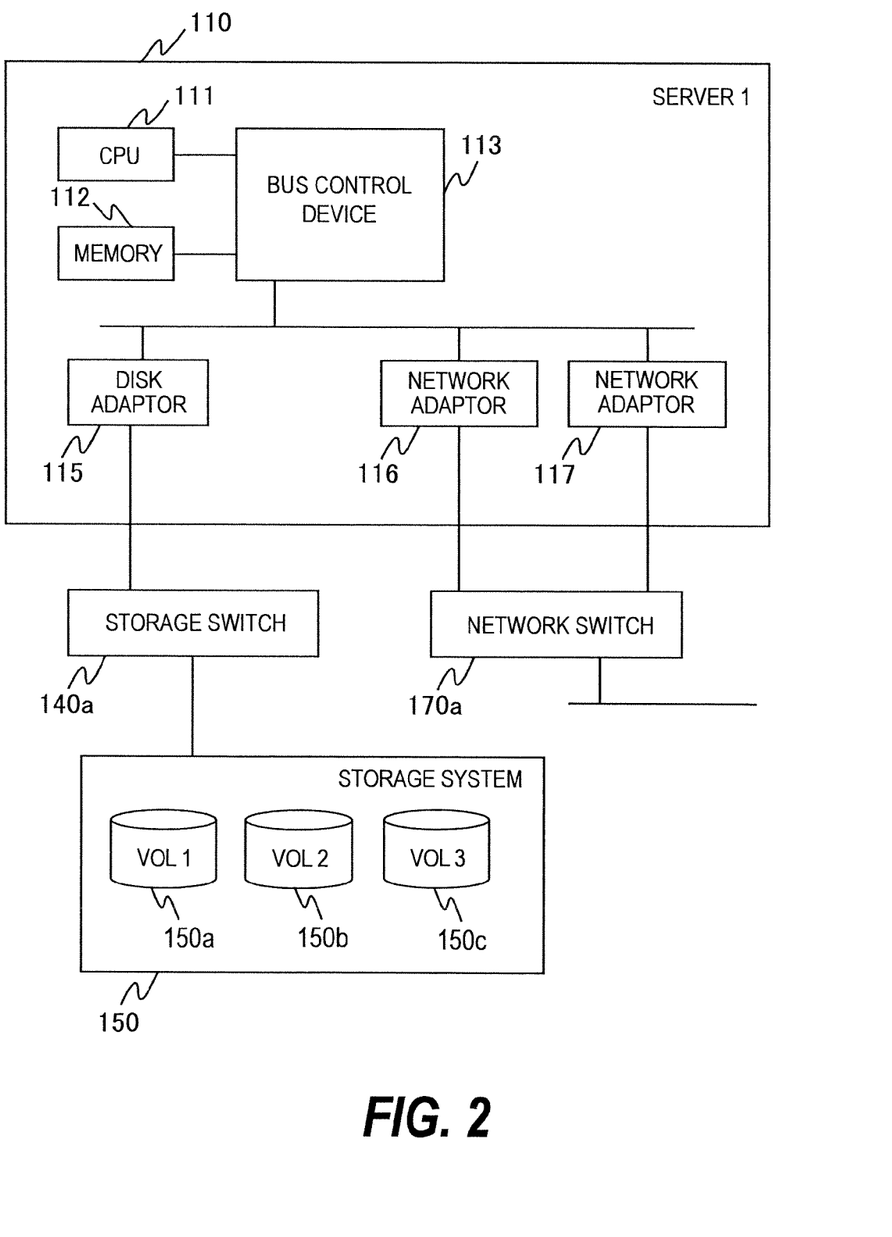
FIG. 2 is a block diagram showing an example of a hardware configuration of a server machine according to the first embodiment of this invention.

FIG. 1 is an example of a system configuration of the first embodiment of this invention. In FIG. 1, reference numerals 110 to 130 denote sever machines. A configuration example of the sever machine is shown in FIG. 2, and is a computer having a general configuration.

The sever machines 110 to 130 are coupled to storage systems 150 and 160 via storage switches 140a and 140b. To the storage system 150, logical volumes 150a to 150c, which can be accessed as logical volumes from the sever machines 110 to 130, are set. Similarly, to the storage system 160, logical volumes 160a to 160c are set.

Moreover, the server machines 110 to 130 construct a network via network switches 170a and 170b. To the network constructed via the network switch 170a, another server machine 190a is coupled, and, to the network constructed via the network switch 170b, another server machine 190b is coupled.

In addition, a management server 100, which holds management information on the overall system and exercises control over the migration process of VM's, is coupled to a management network 180. The server machines 110 to 130 are also coupled to the management network 180, and the management server 100 is configured to communicate with the respective server machines 110 to 130.

According to this invention, the server machines 110 to 130 execute a plurality of VM's by means of virtualization. A description will be given of this configuration later.

In FIG. 1, the network switches 170a and 170b construct a network used for mutually coupling the server machines 110 to 130 and the server machines 190a and 190b with each other, and this network can be constructed by a LAN to which the Ethernet (registered trademark), for example, is applied. Moreover, the storage switches 140a and 140b construct a storage area network (SAN) which couples the server machines 110 to 130 and the storage systems 150 and 160 with each other, and a fibre channel (FC), for example, can be applied to the SAN.

FIG. 2 is a block diagram showing an example of a configuration of the server machine according to the first embodiment of this invention. The server machine 110 is constituted by coupling a CPU 111, a memory 112, a disk adaptor 115, and network adaptors 116 and 117 with each other via a bus control device 113. The CPU 111 carries out predetermined processes by execution of programs stored in the memory 112. In the following section, description is given assuming that the predetermined processes are carried out by the programs.

The disk adaptor 115 is coupled to the storage switch 140a. The disk adaptor 115 has ports used for physical connections to the external storage system 150 and the storage switch 140a. To those ports, an identifier (such as a world wide port name (WWPN)) unique to the respective ports can be assigned. The storage switch 140a, based on an identifier set to a port of the source of the connection, can restrict storage systems to be coupled from the port. Similarly, the storage system 150, according to information of the identifier of the port of the source of an access, carries out access control to the logical volumes 150a to 150c in the storage system 150. For example, there can be provided a setting that while the server machine 110 can access the logical volume 150a (VOL1) via the storage switch 140a from the disk adaptor 115, the server machine 110 cannot access the logical volume 150b.

The network adaptors 116 and 117 are coupled to the network switch 170a, thereby communicating with the server machines 190a and 120. The network switch 170a has a virtual network (VLAN) function which can divide a single network into a plurality of networks, and can carry out access control which enables communication only with devices set in advance by adding a tag to transmitted and received packets. It should be noted that the server machine 110 has a network adaptor (not shown) used for communication with the management network 180.

While the above section describes the server machine 110, the other server machines 120 and 130, the management server 100, and the server machines 190a and 190b are configured in the same way. It should be noted that the management server 100, and the server machines 190a and 190b have a configuration without the disk adaptor 115 of the above-mentioned server machine 110.

Figure 3:
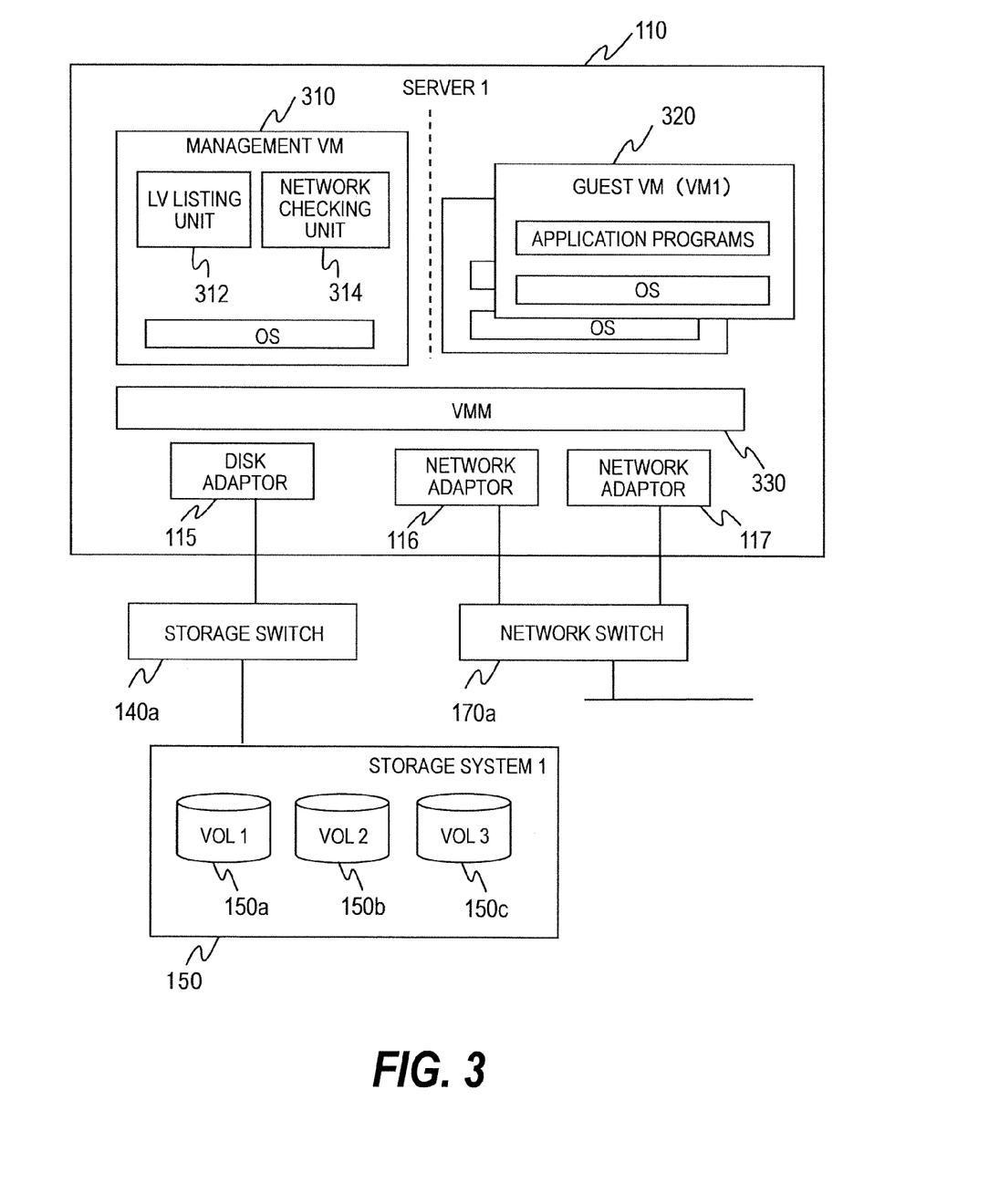
FIG. 3 is a block diagram showing an example of a software configuration of the server machine according to the first embodiment of this invention.

FIG. 3 is a block diagram showing an example of a configuration of software programs executed by the server machines 110 to 130. In the server machine 110, a virtual machine monitor (VMM) 330 carries out overall control of the server machine 110. On the VMM 330, VM's 310 and 320 are running. One of the VM's running on the VMM 330 is the VM 310, which provides a management interface for the outside, and is referred to as a management VM 310 hereinafter. In FIG. 3, the VM 310 is shown as the management VM. According to this embodiment, the management VM 310 implements a logical volume (LV) listing unit 312 and a network checking unit 314. VM's other than the management VM are referred to as guest VM's.

In FIG. 3, on the VMM 330 of the server machine 110, the management VM 310 and the guest VM 320 are running. The management VM 310 provides the outside such as the management server 100 with the management interface, and manages the guest VM operating on the VMM 330. On the guest VM 320, an OS (guest OS) and application programs are executed.

On the management VM 310, the LV listing unit 312 which acquires and reports the logical volumes 150a to 150c of the storage system 150 used by the OS and the guest VM 320, and the network checking unit 314 which checks the network switch 170a to which the guest VM 320 is coupled, and the server machine 190a which is a destination of the connection are running.

In this system, for example, a possibility of migrating the guest VM 320 operating on the server machine 110 to the server machine 130 shown in FIG. 1 is checked. The server machine 130 is coupled to the storage system 160 via the storage switch 140b. On the other hand, the server machine 110 is coupled to the storage system 150 via the storage switch 140a. Since the server machine 110 and the server machine 130 are coupled to the different storage systems, the guest VM 320 running thereon cannot refer to the same logical volumes.

The same holds true for connectivity of the networks, and while the server machine 110 can communicate with the server machine 190a via the network switch 170a, the server machine 130 is coupled to the network switch 170b, with the result that the guest VM 320 cannot access the server machine 190a.

The first embodiment of this invention provides a method of finding out this connectivity problem before the execution of the guest VM 320.

A description will now be given of the method of determining the volume connectivity on a server machine to execute a guest VM.

Figure 4:
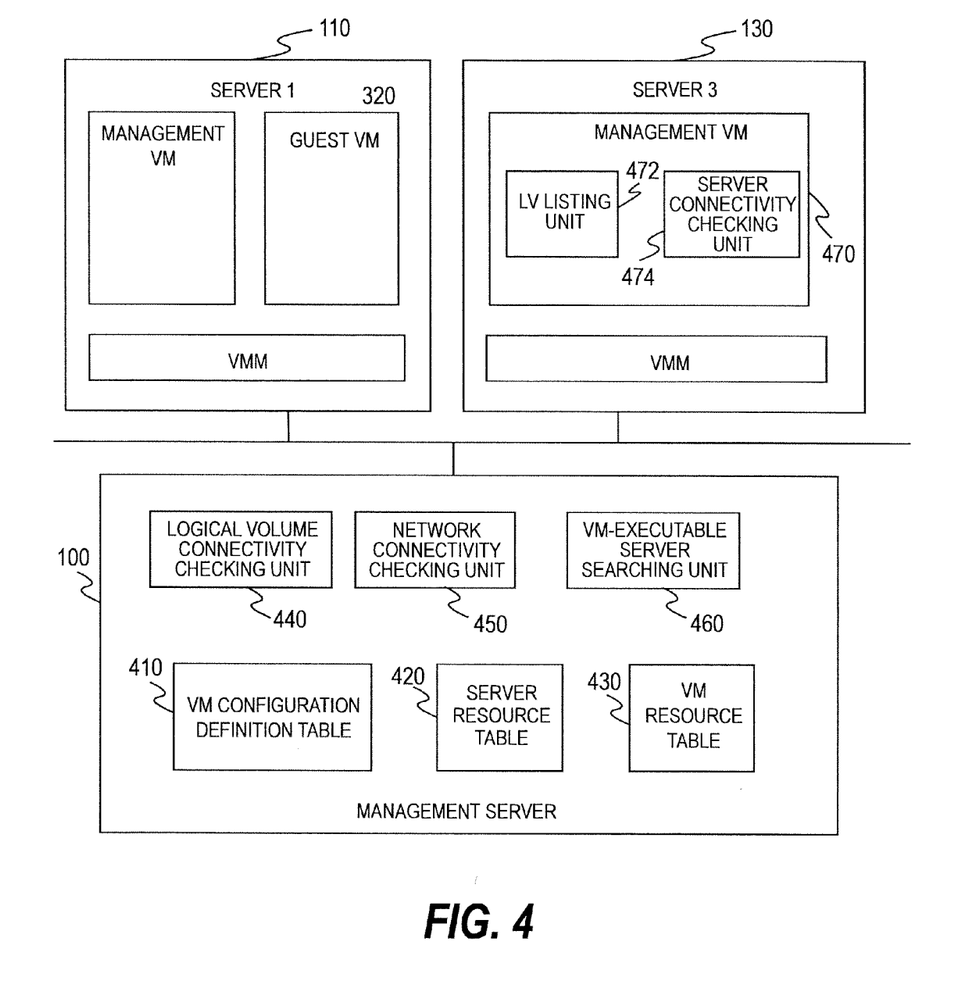
FIG. 4 is a block diagram showing an example of a software configuration of a management server and the server machines involving in migration according to the first embodiment of this invention.

FIG. 4 is a block diagram showing a system configuration according to the first embodiment of this invention. The description will be given of a case in which the guest VM 320 (VM1) running on the server machine 110 (SERVER 1) is to migrate to the server machine 130 (SERVER 3).

The management server 100 manages data such as a VM configuration definition table 410, a server resource table 420, and a VM resource table 430 holding identifiers of logical volumes referred to by the defined VM's, and host names of external server machines accessed by the VM's. In addition, the management server 100 implements processes such as a logical volume connectivity checking unit 440, a network connectivity checking unit 450, and a VM-executable server searching unit 460. Moreover, a management VM 470 running on the server machine 130 of the migration destination implements processes such as a logical volume listing unit 472, and a server connectivity checking unit 474. Those processes are configured so as to be called from the outside.

Figure 5:
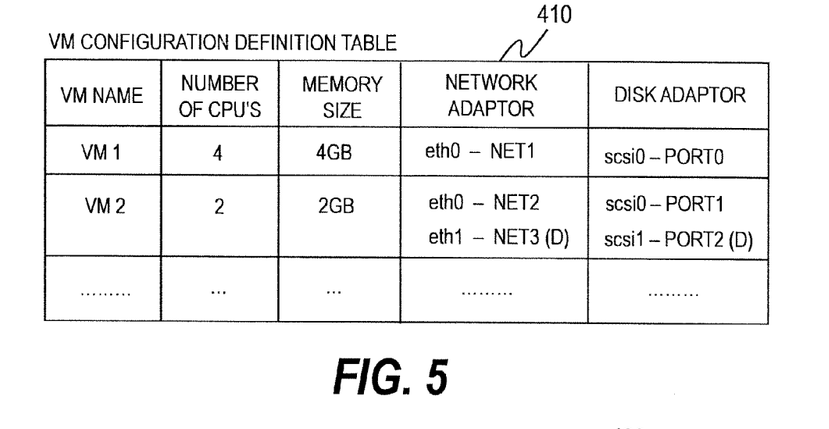
FIG. 5 shows an example of a VM configuration definition table according to the first embodiment of this invention.

FIG. 5 describes an example of a data structure of the VM configuration definition table 410 according to the first embodiment of this invention. A description will now be given of the VM configuration definition table 410.

The VM configuration definition table 410 holds definitions of guest VM's executable in the computer system of the server machines 110 to 130. For example, the VM configuration definition table 410 holds definitions such as, in addition to VM names which are identifiers identifying guest VM's, the number of logical CPU's assigned to the respective guest VM's, and memory quantities, virtual network adaptors and disk adaptors to be defined on the guest VM's.

A definition of a network adaptor holds a network adaptor name (such as eth0), a network identifier (such as NET1) set to a port of the network adaptor coupled to a network switch, and flag information (D) indicating whether a physical network adaptor corresponding to the network adaptor is assigned in a dedicated manner (exclusively).

In FIG. 5, a network adaptor definition "eth1-NET3 (D)" of a guest VM name "VM2" indicates that a network adaptor name is eth1, a network identifier is NET3, and an exclusive assignment of a physical network adaptor to the guest VM is necessary, which is indicated by the flag information (D). If the network switches 170a and 170b provide tag-based VLAN's, a tag name is used as the network identifier.

Similarly, a definition of a disk adaptor holds a disk adaptor name, a port identifier set to a port of the disk adaptor coupled to a storage switch, and a flag information indicating whether a physical disk adaptor corresponding to the virtual disk adaptor is assigned in a dedicated manner (exclusively).

For example, a disk adaptor definition "scsi1-PORT2 (D)" of the guest VM name "VM2" of FIG. 5 indicates that a disk adaptor name is scsi1, a port identifier is PORT2, and an exclusive assignment of a physical disk adaptor is necessary, which is indicated by the flag information (D). The VM configuration definition table 410 is produced by a user of the system. For example, an administrator can set the VM configuration definition table 410 on a console (not shown) of the management server 100.

Figure 6:
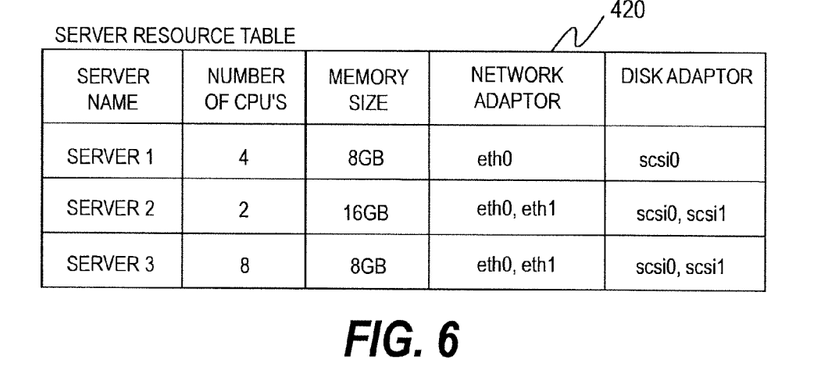
FIG. 6 shows an example of a server resource table according to the first embodiment of this invention.

FIG. 6 describes an example of the server resource table 420. The server resource table 420 holds states of assignments of resources of the respective server machines in the system. The server resource table 420 holds, in addition to server names which are identifiers identifying the server machines 110 to 130, and the number of CPU's and a memory size which the respective server machines 110 to 130 are carrying, information on physical network adaptors and physical disk adaptors provided by the respective server machines 110 to 130 to realize the guest VM's. This server resource table 420 is constructed by the management server 100 by acquiring information from the VMM and the management VM of the server machines 110 to 130 on a predetermined timing. The example in which the server names of the server machines 110, 120, and 130 are "SERVER 1", "SERVER 2", and "SERVER 3", respectively, as shown in FIG. 1, but identifiers such as IP addresses may be used as the server names.

Figure 7:
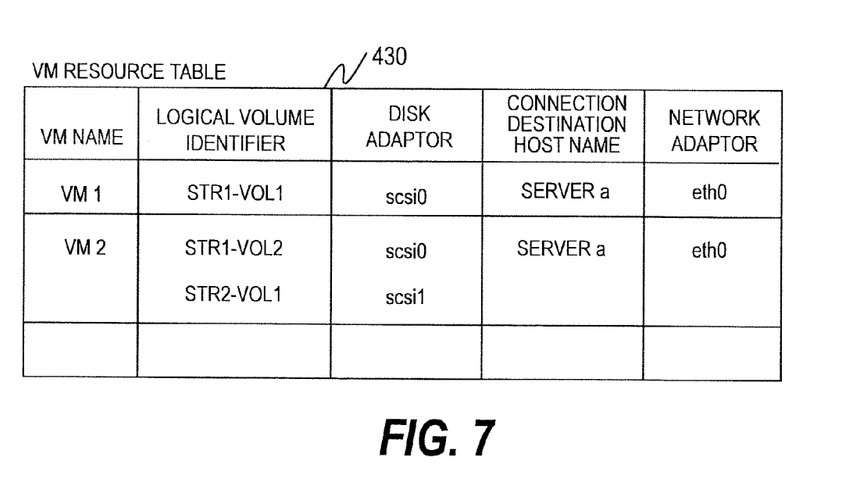
FIG. 7 shows an example of a VM resource table according to the first embodiment of this invention.

FIG. 7 describes an example of the VM resource table 430 for storing machine resources used by the guest VM's to be executed on the server machines 110 to 130.

The VM resource table 430 holds information on logical resources used by the respective guest VM's defined in the system. According to this embodiment, the VM resource table 430 records VM names which are identifiers identifying the guest VM's, logical volume identifiers indicating logical volumes accessed by the guest VM's, names of physical disk adaptors used by the guest VM's for access to the logical volumes, connection destination host names storing server names used by application programs to be executed on the guest VM's, and network adaptor names storing identifiers of the network adaptors used by the guest VM's. Of the logical volume identifiers of FIG. 7, "STR1" indicates the storage system 150, "STR2" indicates the storage system 160, and "VOL1" indicates the logical volume 150a or 160a as shown in FIG. 1.

This VM resource table 430 is a table defined by a user (administrator) in advance as the VM configuration definition table shown in FIG. 5.

Figure 8:
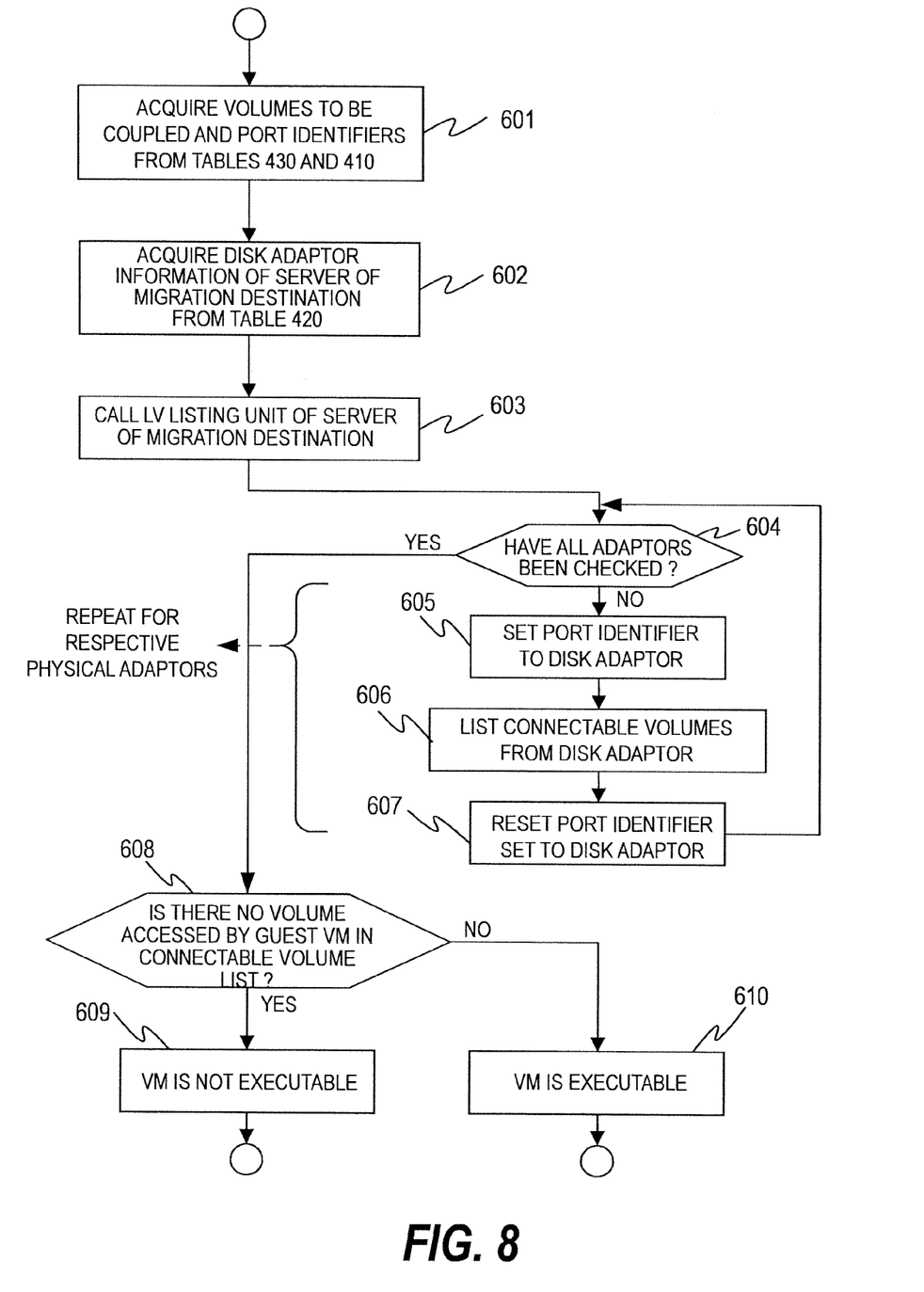
FIG. 8 is a flowchart showing an example of a logical volume connectivity checking process carried out by the management server and a server machine of a migration destination according to the first embodiment of this invention.

A description will now be given of a process flow carried out, when a guest VM migrates between server machines, by the logical volume connectivity checking unit 440 on the management server 100 and the logical volume listing unit 472 on the management VM 470 of the migration destination for checking connectivity of logical volumes. FIG. 8 shows a flowchart showing an example of the process executed on the management server 100 and the management VM 470 of the migration destination.

For a migration of a guest VM, a user specifies, on a console of the management server 100 or the like, a guest VM to migrate and a server machine of the migration destination. In response to this specification, the management server 100 checks connectivity of the guest VM to migrate.

First, in a connectivity checking process, identifiers of logical volumes accessed by the guest VM 320 to migrate, and port identifiers to be set to physical disk adaptors are acquired from the VM resource table 430 and the VM configuration definition table 410 (Step 601). In this example, the VM name of the guest VM 320 is "VM1", the identifier of the logical volume to be coupled is "STR1-VOL1", and the port identifier is "PORT 0". An identifier of a logical volume is an identifier for uniquely identifying the logical volume in the system, and is a combination of a vendor name of a storage system holding the logical volume, a system name, and a logical volume number, for example. A port identifier is an identifier corresponding to a world wide port name (WWPN) when a fibre channel is employed, for example.

Then, in the connectivity checking process, information on physical disk adaptors available for a guest VM on the server machine 130 of the migration destination is acquired from the server resource table 420 (Step 602). In this example, the server name of the server machine 130 of the migration destination is SERVER 3, and physical disk adaptors listed on the SERVER 3 in the server resource table 420 are scsi0 and scsi1.

In the connectivity checking process, the logical volume (LV) listing unit 472 executed on the management VM 470 of the server machine 130 of the migration destination is called with the data collected as described above as parameters (Step 603).

The LV listing unit 472 lists logical volumes which are connectable from the server machine 130. In order to list the logical volumes, the LV listing unit 472 carries out Steps 604 to 607 for the respective available physical disk adaptors acquired by the management server 100 in Step 602.

First, the LV listing unit 472 sets the port identifier of the parameters received from the management server 100 to the physical disk adaptor (Step 605). As a result, as shown in FIG. 1, the storage switch 140b coupled to the SERVER 3 (server machine 130) checks access permission to the logical volumes 160a to 160c by using the set port identifier. After the LV listing unit 472 has set the port identifier, the LV listing unit 472 lists logical volumes which are connectable from this physical disk adaptor (Step 606). In this listing process, the LV listing unit 472 acquires identification information on the respective logical volumes which are connectable, and generates logical volume identifiers. Finally, the LV listing unit 472 resets the port identifier set to the physical disk adaptor (Step 607). If there is a physical disk adaptor which has not been checked, the LV listing unit 472 repeats the same processes, and after the LV listing unit 472 has carried out the listing process for all the physical disk adaptors, the LV listing unit 472 calls a list of the identifiers of the logical volumes and returns the list of the identifiers of the logical volumes to the source of the call (Step 604).

In the connectivity checking process on the management server 100, the list of the identifiers of the connectable logical volumes generated by the LV listing unit 472 of the server machine 130 is referred to, and whether all the logical volumes accessed by the guest VM 320 to migrate are included in the list of the connectable logical volumes is checked (Step 608). If all the volumes required for the execution of the guest VM 320 are included in the list of the connectable logical volumes, it is determined that the guest VM 320 is executable (Step 610), and if not all the volumes are included in the list, it is determined that the guest VM 320 is not executable (Step 609).

In this example, because the storage switch 140b to which the SERVER 3 is coupled is not coupled to the storage system 150, the guest VM 320 to migrate cannot be coupled to the logical volumes 150a to 150c originally referred to on the server machine 110. Therefore, the list of the connectable logical volumes returned by the LV listing unit 472 does not include "STR1-VOL1", and it is determined that the guest VM 320 is not executable in the connectivity checking process.

As described above, it is possible to determine whether the logical volumes required for the execution of the guest VM 320 are accessed from the server machine 130 on which the guest VM 320 is to be executed before the guest VM 320 is actually executed. While, according to this embodiment, the connectivity of the logical volumes upon the migration of the guest VM 320 is checked, this embodiment can be applied to a case other than migration for simply determining on which server machines the guest VM 320 can be executed.

In this way, when a host machine (server machine) for executing a guest VM is changed, it is possible to quickly and automatically determine in advance whether logical volumes required by the guest VM are connectable. As a result, it is possible to eliminate the possibility of executing the guest VM by mistake on a host machine on which access to the logical volumes used by the guest VM is not available. In other words, it is possible to reduce a period of time in which the guest VM 320 is stopped.

Second Embodiment

The first embodiment describes the check for the connectivity of the logical volumes used by the guest VM 320. The execution of the guest VM 320 also requires network connections in addition to the connection to the storage systems. As in the case of the storage systems, if the network switch checks access permission according to an identifier assigned to a port of a network adaptor, thereby constructing a VLAN, a server machine of the migration destination may not make connections to necessary machines.

As a second embodiment of this invention, a description will be given of a check for connectivity to networks. The check for connectivity to networks on a migration destination of the guest VM 320 is carried out by the network connectivity checking unit 450 of the management server 100 and the server connectivity checking unit 474 of the management VM 470 of the server machine 130 of the migration destination shown in FIG. 4.

A process flow of the network connectivity checking unit 450 and the server connectivity checking unit 474 which check connectivity to networks is similar to that for checking the connectivity to the logical volumes according to the first embodiment shown in FIG. 8. The following description, as in the first embodiment, will be given of the example in which the guest VM 320 executed on the server machine 110 (SERVER 1) migrates to the server machine 130 (SERVER 3).

In the network connectivity check, first, the network connectivity checking unit 450 of the management server 100 acquires connection destination host names from the VM resource table 430. In this example, a server machine to which the guest VM 1 couples is a SERVER A. Then, the network connectivity checking unit 450 acquires eth0 and eth1 as information on the network adaptors available for the guest VM 320 on the server machine 130 of the migration destination from the server resource table 420, and calls the server connectivity checking unit 474 running on the SERVER 3 which is the migration destination with this information as parameters. The server connectivity checking unit 474 of the server machine 130 checks whether the SERVER A is connectable from the specified network adaptors. The check for the accessibility to the SERVER A used by the guest VM 320 is, for example, carried out by means of a ping command or the like. The server machine 130 of the migration destination returns a result of this check to the network connectivity checking unit 450 of the management server 100.

The network connectivity checking unit 450 of the management server 100 determines whether the guest VM 320 can be coupled to the network to be used according to the returned result.

According to the above process, before the guest VM 320 is actually executed on a certain server machine, it is possible to quickly determine whether the server machine can be coupled to the connection destination on networks used by the guest VM 320.

According to the second embodiment, it is determined only whether the connection to the SERVER A referred to by the guest VM 320 is possible, but, as in the case of the connectivity check for the logical volumes, the process may be carried out by, after applying network configuration information which corresponds to a port identifier of the physical disk adaptor to network adaptors of a migration destination, determining whether the connection to the SERVER A is possible.

Moreover, in order to determine whether a resource referred to by the guest VM 320 is connectable from a certain server machine, both the first embodiment and the second embodiment may be carried out. In the above description of the embodiments, the processes are carried out when the guest VM is to be executed or the guest VM is to migrate. However, the processes may be carried out in advance thereby determining whether to which logical volumes and to which networks the respective server machines are connectable in advance, and, when the guest VM is to be executed or the guest VM is to migrate, the connectivity determined in advance may be referred to for determining whether the guest VM is executable.

Third Embodiment

Figure 9:
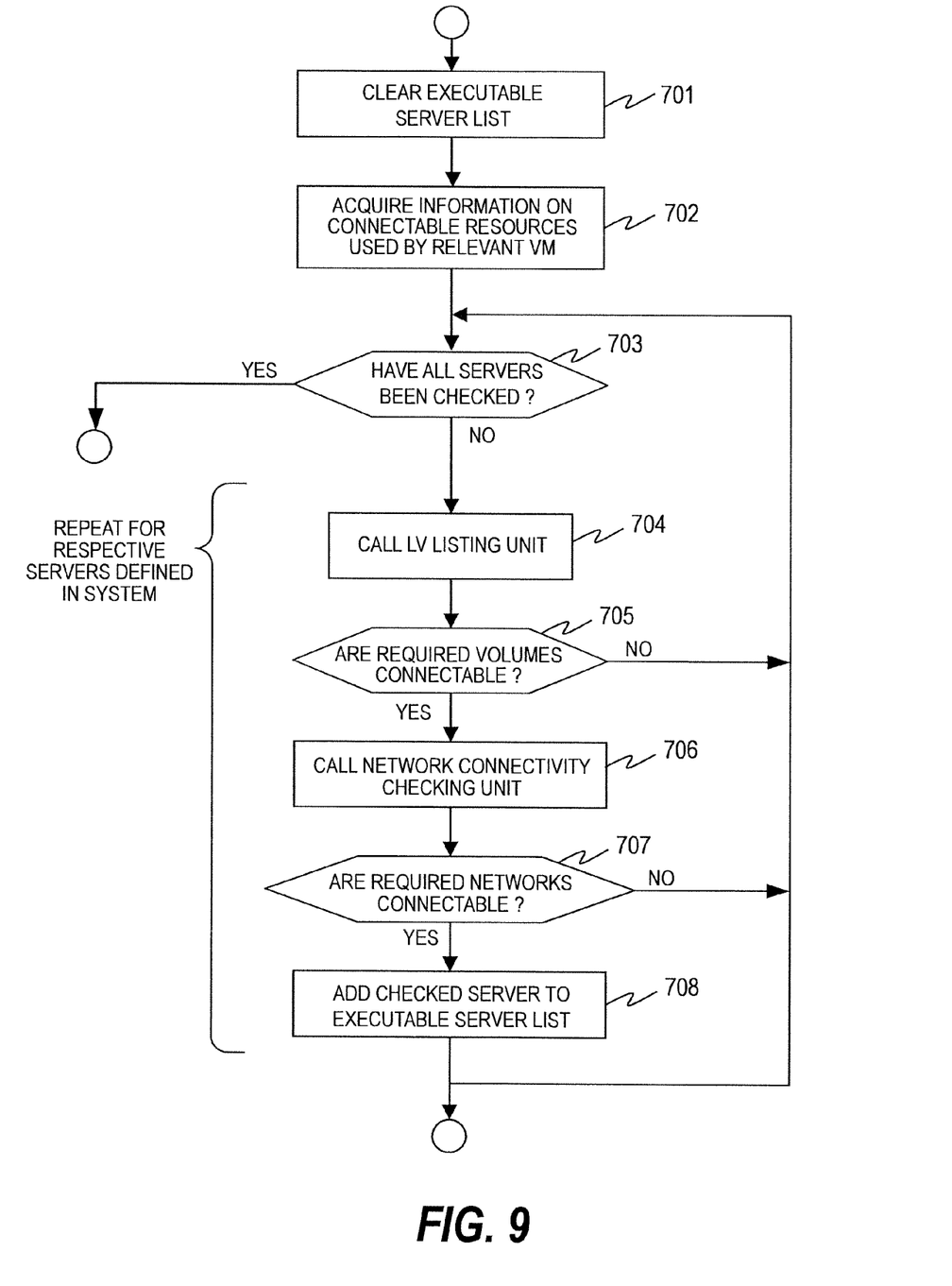
FIG. 9 is a flowchart showing an example of a VM-executable server listing process carried out by the management server according to a third embodiment of this invention.

A description will now be given of a third embodiment of this invention. The third embodiment provides a method of determining server machines which can execute a certain guest VM. FIG. 9 shows a process flow carried out by a VM-executable server searching unit 460 of the management server 100 according to this embodiment.

The process for searching for resources which can execute a guest VM is carried out mainly by the VM-executable server searching unit 460 of the management server 100 shown in FIG. 4.

When the management server 100 receives an identifier of a guest VM from a console (not shown) or other machines, and is instructed to search for server machines which can execute the guest VM, the management server 100 calls the VM-executable server searching unit 460. It should be noted that a higher-level program which determines an arrangement of guest VM's may call the VM-executable server searching unit 460 with the guest VM as a parameter for which executable server machines are determined.

A search process carried out by the VM-executable server searching unit 460, as initialization, clears a list (executable server list) for holding names of server machines which can execute the guest VM (Step 701). The executable server list is a table which is stored in a memory of the management server 100 or the like, and stores the identifiers of the server machines 110 to 130 for the respective identifiers of the guest VM's.

Then, the VM-executable server searching unit 460 acquires information on logical volumes and networks accessed by the guest VM (Step 702). Specifically, the information includes identifiers of the logical volumes, port identifiers set on physical disk adaptors, necessity of dedicated allocation of the physical disk adaptors, network names of connection destinations, and necessity of dedicated allocation of the physical network adaptors. They can be acquired from the VM resource table 430 and the VM configuration definition table 410.

Then, the VM-executable server searching unit 460 carries out processes in following Steps 703 to 707 for the respective server machines 110 to 130 in the system.

First, the VM-executable server searching unit 460 calls the LV listing unit 472 executed by the management VM of a server machine presently in question with the acquired information on the logical volumes as parameters, and acquires logical volumes which are connectable from the server machine (Step 704). The VM-executable server searching unit 460 checks whether the acquired logical volumes include all the identifiers of the logical volumes referred to by the guest VM, thereby determining whether the logical volumes required for the execution of the guest VM are accessed from the server machine (Step 705). If access from the server machine to the logical volume required for the execution of the guest VM is not possible, the VM-executable server searching unit 460 returns to Step 703, and checks a next server machine in the system. Steps 704 and 705 are similar to the processes in the first embodiment.

If the connections from the server machine to the logical volumes required for the execution of the guest VM are available, the VM-executable server searching unit 460 checks the connectivity to the networks. The VM-executable server searching unit 460 calls the server connectivity checking unit 474 executed by the management VM of the server machine, and causes the server connectivity checking unit 474 to check whether connections from the server machine to external servers (or resources on networks) required for the execution of the guest VM are possible (Step 706). If the connections from the server machine to the resources on networks required for the execution of the guest VM are not possible, the VM-executable server searching unit 460 returns to Step 703, and checks a next server machine in the system. It should be noted that the process in Step 706 may be carried out as in the second embodiment.

Then, if the network connections from the server machine required for the execution of the guest VM are available (Step 707), the VM-executable server searching unit 460 adds the name of the server machine to the list of the executable server machines (Step 708), and returns to Step 703 for checking a next server machine in the system.

In Step 703, if no server machine is left for the check, the process ends.

With the above-mentioned process, the list of the server machines which can be coupled to the logical volumes and the network resources referred to by the specified guest VM is obtained as the executable-server list. This executable server list is a list of the server machines which can execute the guest VM. A user (or administrator) can narrow down server machines which can execute the guest VM by referring to the executable server list. For a large-scale system including a number of server machines, network switches, and storage switches, candidates of server machines which can execute a guest VM are shown as a list, so a user can save labor required for management of guest VM's.

Moreover, when the VM-executable server searching unit 460 is called by a higher-level program, it is possible, based on the executable server list and other information, to automatically determine an arrangement of guest VM's, or to provide candidates of an arrangement of the guest VM's.

Moreover, if a server machine in the system becomes no longer available due to a failure, the above-mentioned search process may be used for checking to which server machines guest VM's running on the no-longer-available server machine can migrate.

Moreover, when a load on a server machine in the system abnormally increases, and then some of guest VM's running on the server machine are to migrate to other server machines, the search process may be used for checking possible destinations of the migration of the guest VM's.

Fourth Embodiment

Figure 10:
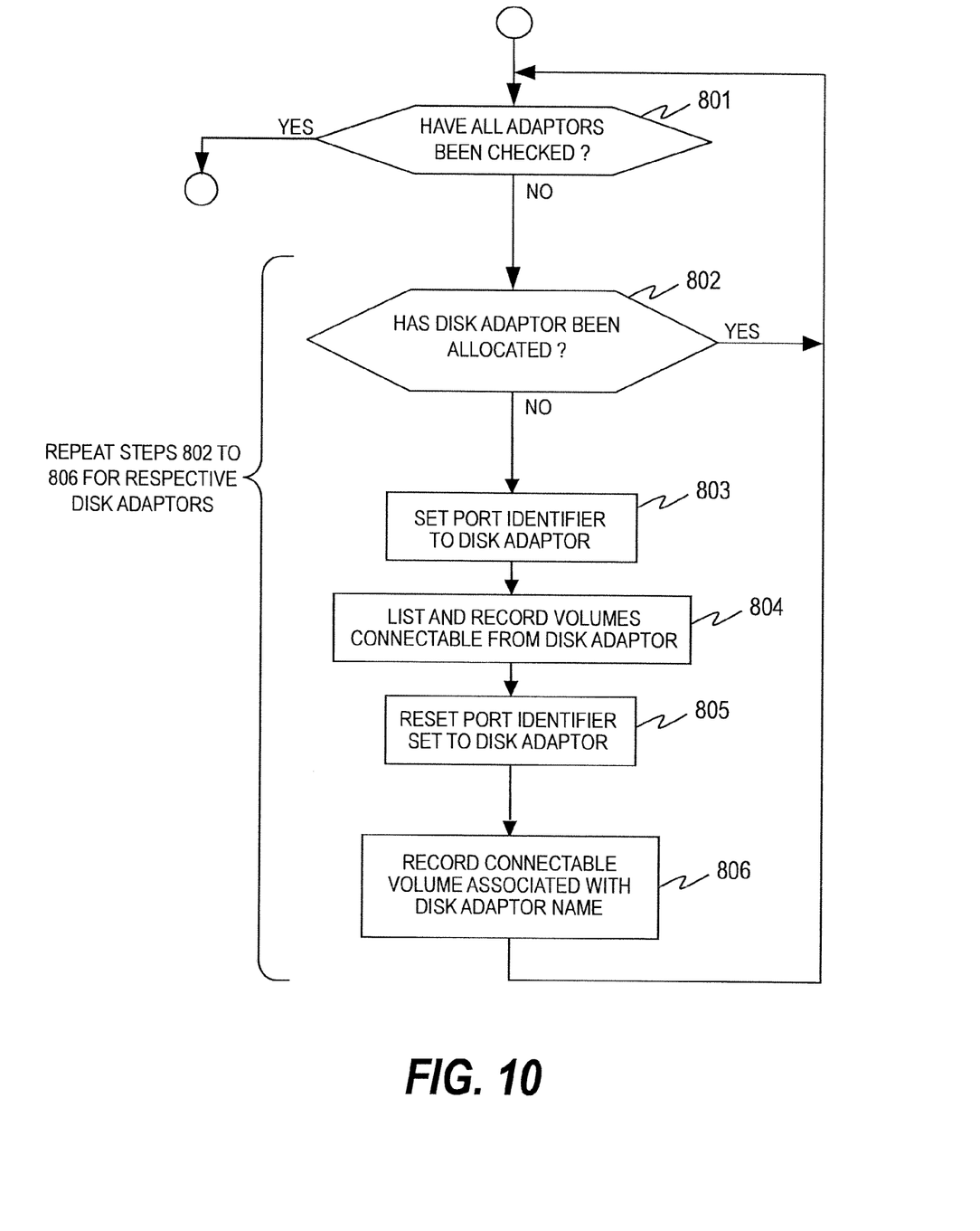
FIG. 10 is a flowchart showing an example of a logical volume connectivity checking process carried out by the management server according to a fourth embodiment of this invention.

FIG. 10 shows a connectivity checking process according to a fourth embodiment considering a case in which physical adaptors are exclusively assigned to virtual disk adaptors and virtual network adaptors defined for a guest VM.

The fourth embodiment describes a listing process of logical volumes when it is necessary to exclusively assign a physical disk adaptor to a virtual disk adaptor defined for a guest VM. FIG. 10 is a flowchart showing an example of a process carried out by the logical volume listing unit 472 of the management VM 470. It should be noted that the other configurations are the same as those of the first embodiment.

The process shown in FIG. 10 is approximately the same as the process from Steps 604 to 607 of the first embodiment shown in FIG. 8. However, the process is different in that physical disk adaptors to be checked in order to list connectable logical volumes are limited to physical disk adaptors which are not exclusively assigned on the server machines, and that information on volumes connectable by means of the exclusive allocation of the physical disk adaptors is acquired.

In the listing process of logical volumes, processes from Steps 802 to 806 are executed for all physical disk adaptors installed on a server machine. The process ends when all the physical disk adaptors have been checked (Step 801).

First, it is checked whether a physical disk adaptor of the server machine has already been exclusively assigned to a running guest VM, and if the physical disk adaptor has been exclusively assigned, the listing process proceeds to a check for another physical disk adaptor (Step 802).

If the physical disk adaptor is not exclusively assigned, logical volumes connectable from the physical disk adaptor are listed (Steps 803, 804). Those processes are the same as those of Steps 605 to 607 in FIG. 8.

Then, the disk adaptor name is associated with the data recording the logical volumes connectable from the physical disk adaptor, and recorded (Step 806). As a result, for the respective connectable logical volumes, the physical disk adaptor which is used for the connection thereto and can be exclusively assigned can be recorded.

If there are other physical disk adaptors, the processes from Steps 802 to 806 are repeated.

As a result of the above listing process, it is possible to determine whether logical volumes required by a specified guest VM are connectable in addition to whether logical volumes which are required for the exclusive allocation of the physical disk adaptor are connectable.

As a result, a user (or administrator) can determine the possibility of executing a guest VM including the possibility of connection to logical volumes via an exclusively assigned physical disk adaptor before the guest VM is actually executed on a server machine.

In the above embodiment, the method of checking connectivity from a server machine to logical volumes is described, and the check of connectivity to networks may be carried out in the same manner. When the process of listing connectable logical volumes in the process according to the fourth embodiment is replaced by the process according to the second embodiment, it is possible to determine the network connectivity in consideration of exclusive assignment of a physical network adaptor. As a result, for the guest VM's in the system, a user can easily know a possibility of executing a guest VM based on the performance and connectivity.

Further, it is also possible to combine the fourth embodiment and the third embodiment, thereby searching for VM-executable server machines in consideration of exclusive allocation of physical devices. This enables easy selection of a server machine which executes a guest VM in consideration of the execution performance of the guest VM, resulting in a reduction of load of the system management imposed on a user.

Additionally, this combination can cause the VM relocation to be carried out by a higher-level program, such as determination of relocation of guest VM's upon a server failure, or upon a high load imposed on a server machine while the performance and connectivity of the guest VM's are considered.

As described above, this invention may be applied to a management system and a management software program for a plurality of computers including virtual machines.

While the present invention has been described in detail and pictorially in the accompanying drawings, the present invention is not limited to such detail but covers various obvious modifications and equivalent arrangements, which fall within the purview of the appended claims.

What is claimed is:

1. A method of checking, in a virtual machine system comprising a plurality of physical computers including a first physical computer for executing a first virtual machine and a second physical computer capable of executing a virtual machine, whether the first virtual machine can be executed by the second physical computer, logical resources accessible from the plurality of physical computers being limited by setting information set to a plurality of physical interfaces of the plurality of physical computers, the method comprising the following steps performed by the plurality of physical computers of the virtual machine system:

acquiring setting information set to a first physical interface of the first physical computer so that the first virtual machine accesses first logical resources;

listing second logical resources accessible from a second physical interface of the second physical computer in a case where the acquired setting information is set to the second physical interface and the first virtual machine is executed by the second physical computer with the setting information; and determining whether the first virtual machine can be executed by the second physical computer by comparing the first logical resources and the second logical resources, wherein:

if a second physical interface to be checked on accessibility to the second logical resources is exclusively assigned to a virtual machine executed by the second physical computer when the step of listing second logical resources is executed, the step of listing second logical resources comprises:

excluding the second physical interface from the second logical resources to be checked, listing second logical resources accessible from another physical interface yet to be assigned to any other virtual machine, and acquiring information on accessibility to the second logical resources in a case where the other physical interface is exclusively assigned.

2. The method according to claim 1, wherein:
the first logical resources and the second logical resources comprise logical volumes in a storage system, and
the setting information comprises data set to a physical interface coupled to the storage system.

3. The method according to claim 2, wherein the setting information comprises an identifier of a port set to a fibre channel adaptor coupled to the storage system.

4. The method according to claim 1, wherein:
the first logical resources and the second logical resources comprise data used for identifying a computer accessed during the execution of the first virtual machine, and
the setting information comprises data set to a network adaptor coupled to a network used for the access to the computer.

5. The method according to claim 4, wherein the setting information comprises setting data relating to a virtual network.

6. A method of checking, in a virtual machine system comprising a plurality of physical computers including a first physical computer for executing a first virtual machine and a plurality of second physical computers capable of executing a virtual machine, whether the first virtual machine can be executed by the plurality of second physical computers, logical resources accessible from the plurality of physical computers being limited by setting information set to a plurality of physical interfaces in the plurality of physical computers, the method comprising the following steps performed by the plurality of physical computers of the virtual machine system:
acquiring setting information set to a physical interface of the first physical computer so that the first virtual machine accesses first logical resources;
setting the setting information to physical interfaces of the plurality of second physical computers, and listing second logical resources accessible for each case where the first virtual machine is executed by a respective one of the plurality of second physical computers;
determining individually whether the first virtual machine can be executed by the plurality of second physical computers by comparing the first logical resources and the second logical resources; and
listing second physical computers which are determined to be able to execute the first virtual machine, out of the plurality of second physical computers, wherein:
if a second physical interface to be checked on accessibility to the second logical resources is exclusively assigned to a virtual machine executed by the second physical computer when the step of listing second logical resources is executed, the step of listing second logical resources comprises:
excluding the second physical interface from the second logical resources to be checked,
listing second logical resources accessible from another physical interface yet to be assigned to any other virtual machine, and
acquiring information on accessibility to the second logical resources in a case where the other physical interface is exclusively assigned.

7. The method according to claim 6, wherein:
the first logical resources and the second logical resources comprise logical volumes in a storage system, and
the setting information comprises data set to a physical interface coupled to the storage system.

8. The method according to claim 7, wherein the setting information comprises an identifier of a port set to a fibre channel adaptor coupled to the storage system.

9. The method according to claim 6, wherein:
the first logical resources and the second logical resources comprise data used for identifying a computer accessed during the execution of the first virtual machine, and
the setting information comprises data set to a network adaptor coupled to a network used for the access to the computer.

10. The method according to claim 9, wherein the setting information comprises setting data relating to a virtual network.

* * * * *